Nov. 5, 1946.  F. O. CARLSON  2,410,713
FLEXIBLE TAPE RULE WITH LOCK AND CLOSURE
Filed May 8, 1944
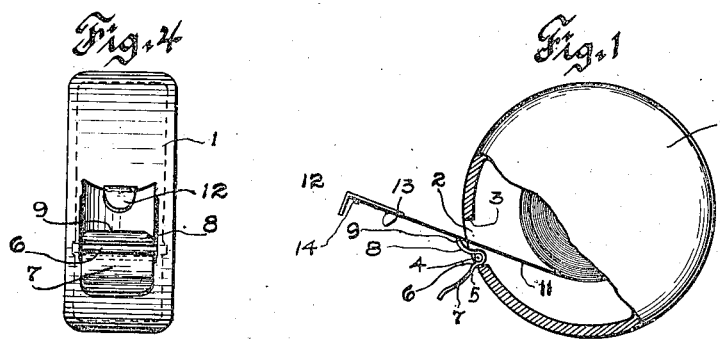
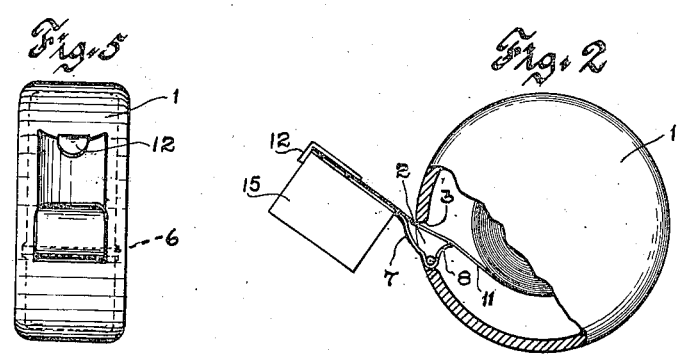
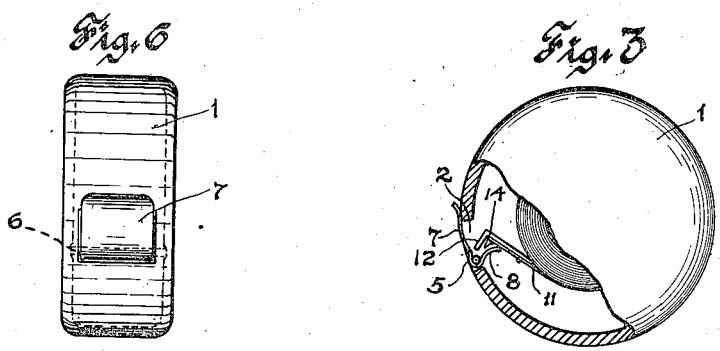
INVENTOR.
Frederick O. Carlson,
BY Saywell & Wesseler,
ATTORNEYS.

Patented Nov. 5, 1946

2,410,713

UNITED STATES PATENT OFFICE 2,410,713

FLEXIBLE TAPE RULE WITH LOCK AND CLOSURE

Frederick O. Carlson, Cleveland Heights, Ohio, assignor of one-half to Andrew J. Sullivan, Cleveland, Ohio Application May 8, 1944, Serial No. 534,557

7 Claims. (Cl. 242—84.8)

This invention, as indicated, relates to a flexible tape rule with lock and closure. More particularly, the invention comprises a measuring tape formed of thin strip metal, or the like, having resilient characteristics which when coupled with a concavo-convex transverse structure provides a self-sustaining rigidity when open for use and which cooperates with an element serving as a lock for the extended rule or as a locked closure or seal for the rule casing or receptacle. The locking feature of the device is operative both when the rule is extended and when it is closed. The invention also includes the provision of a single unitary structure pivotally mounted to coact with the flexible tape and receive spring tension therefrom in a certain position to serve as a lock and in another position to serve as a lock and closure.

The principal object of the present invention is to improve flexible tape rule construction in relation to both its closed and active condition.

Another object of the invention is to provide a flexible tape rule construction wherein the inherent spring action of the flexible tape bears upon a combined lock and closure to position the same.

Another object of the invention is to provide a flexible tape rule unit having a casing with a closure actuated by the spring tension of the flexible tape.

Another object of the invention is to provide a flexible tape rule unit have a casing with a locking member for the tape when in active use held in position by the spring tension in the tape itself.

Another object of the invention is to provide a flexible tape rule unit having a casing with a closure member held positively in open position by the spring tension of the extended flexible tape.

Another object of the invention is to provide a flexible tape rule unit having a casing with a combined lock and closure continuously under spring pressure of the flexible rule itself and held in fully closed, intermediate, or fully open position, selectively.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but several of various forms in which the principle of the invention may be used.

In said annexed drawing:

Fig. 1 is a side elevation partly in section of a flexible tape rule, showing the tape in course of being drawn to extended position with the locking member in open position;

Fig. 2 is a view similar to Figure 1 showing the locking member in locking engagement with the extended tape;

Fig. 3 is a view similar to Figures 1 and 2, showing the tape in fully retracted position with the closure member in locked or casing sealing position;

Fig. 4 is an edgewise view of the rule tape casing as seen from the left-hand side of Figure 1 with the tape partially extended and the locking member in open position;

Fig. 5 is an edgewise view of the rule tape casing as seen from the left-hand side of Figure 2 with the tape partially extended and the locking member engaged therewith to hold it at a fixed adjustment; and Fig. 6 is an edgewise view of the rule tape casing as seen from the left-hand side of Figure 3 with the closure member in locked or casing sealing position.

As is clearly shown in the several figures of the drawing the rule tape structure comprises a casing I of conventional circular outline as seen in side elevation and of relatively narrow width. The casing may be formed of metal, plastics, or other suitable material. It is provided with an opening 2 for the tape of suitable size to receive the tape width and its terminal member or end tip in cooperative relation, as will be presently described.

The opening adjacent one side has edges 3, rounded to present a smooth running surface for the measuring tape, and adjacent the other side is provided with a pivot pin 4 spaced a slight distance from the adjacent margin of the opening to provide operative clearance for the locking member 5. The locking member 5 may be variously formed, but is preferably formed of a metal plate bent at an intermediate point to provide a recess 6 to engage around the pivot pin 4, and to have its outer portion provide a lid or closure 7 for the opening and conforming to the circumferential contour of the case and to have its inner portion, the angular extension or tongue 8 slidingly engage against the convex under surface of the tape. The free edge 9 of the tongue may be slightly recessed along an arcuate line to partially conform to the curvature of the tape and frictionally engage such surface and when turned to locking position to slightly deform or flex the adjacent tape structure, as will be presently described.

The measuring tape 11 is preferably a metal strip having suitable indicia on one or both sides of its surface. The transverse curvature of the strip gives it a tendency to expand outwardly and to hold a straight line position when drawn outwardly from its casing. The extreme outer end of the tape is provided with a terminal or end tip 12 secured thereto by a pair of rivets 13, 14. The end tip 12 is directed at an angle outwardly and cooperates with the tongue 8 of the locking member 5 when the tip is housed within the casing. As shown in Figure 3 when the lid 7 is closed the tongue 8 bears against the tape adjacent the rivet 14 near the angular portion of the end tip 12, and the outward pressure of the resilient tape acts like a spring in holding the lid tightly against the casing. When the lid is opened by engaging the slightly upturned outer edge thereof the rotation of the locking member 5 brings its tongue portion 8 against the end tip 12 and bodily moves it through the opening 2 where it can be grasped by the fingers and drawn outwardly to any desired extent in the manner shown in Figure 1. It will be noted that the turning of the locking member outwardly moves the tongue past dead center and outwardly through the opening 2, allowing the tape complete freedom of movement through the opening. While the tape is so extended the locking member 5 may be turned to lock the same in such position of adjustment as shown in Figure 2. The tape may be free or have a hub or spring connection centrally of the casing.

This locking engagement is very effective, the tongue 8 pressing against the resilient tape on the inner side of dead center and the lid 7 bearing against the adjacent resilient tape structure and pressing it against the rounded edge 3 of the opening 2. The point of contact of the lid 7 with the tape may be used as a measuring point or abutment with the end tip 12 serving as the other reference point for the dimension after the manner of calipers, as shown in connection with the rectangular object 15 shown in Figure 2. To release the locking member a slight downward pressure on the extended tape will rotate the lid 7 and free the tongue portion 8 as it moves outwardly past dead center.

The measuring tape when forced into the casing cannot disengage the end tip 12 from the tongue 8 as the area of clearance will not permit the outer end of the tape to become lost within the interior of the casing, and the mere lifting of the cover 7 will bring the end tip 12 outside of the casing for ready engagement.

The pivoted locking plate 5 thus serves a series of functions, all under direct spring action of the tape itself, as the closure plate has no spring as a direct part of its own structure. As shown in Figure 1 the tape bears against the under side of the tongue to hold the closure open. In Figure 2, the tape is slightly flexed intermediate the lid and tongue on opposite sides of the pivot, and is locked in adjusted position by the spring action of the tape itself. In Figure 3 the pressure of the tape on the tongue holds the lid firmly against the casing. As shown in Figures 4, 5 and 6, the lid may be made of substantially the width of the opening and presents an extremely smooth close fitting closure excluding all foreign matter from entrance into the interior of the casing and at the same time providing an even practically unbroken surface for the casing over its adjacent peripheral extent.

Other modes of applying the principle of my invention may be used instead of those explained, change being made as regards the mechanism herein disclosed, provided the means stated by any of the following claims or the equivalent of such stated means be employed.

I therefore particularly point out and distinctly claim as my invention:

1. A device of the character described having in combination a casing of conventional outline and narrow width having a marginal opening, a combined closure and locking member pivotally mounted adjacent said opening, an extension tongue on said member adapted to move into and out of said casing, a transversely arched metal measuring tape housed within said casing and having resilient sliding contact with said extension tongue, and means on said tape for engagement by said tongue when said closure member is moved to open position.

2. A device of the character described having in combination a casing of conventional outline and narrow width having a marginal opening, a combined closure and locking member pivotally mounted adjacent said opening, an extension tongue on said member adapted to move into and out of said casing, a transversely arched metal measuring tape housed within said casing and having resilient sliding contact with said extension tongue, and means on said tape for engagement by said tongue to hold the end of said tape always closely adjacent said opening when said closure member is in closed position.

3. A device of the character described having in combination a conventional casing having a narrow opening in its circumferential wall, a concavo-convex measuring tape engaged within said casing and having an angular terminal end tip on its under surface, a closure plate pivotally mounted adjacent the underside of said opening and having an angular tongue portion in resilient contact with said tape through its path of movement to either side of dead center, whereby said closure is positively held selectively in fully open or fully closed position.

4. A device of the character described having in combination a cylindrical casing having a narrow opening in its circumferential wall, a concavo-convex measuring tape engaged within said casing and having an angular terminal end tip on its under surface, a closure plate pivotally mounted adjacent the underside of said opening and having an angular tongue portion in resilient contact with said tape through its path of movement to either side of dead center, said plate at its opposite edge also bearing on said extended tape when the plate is turned to an intermediate position, whereby said closure is positively held in either fully open, intermediate, or fully closed position.

5. A cylindrical casing for a measuring tape having a marginal opening, a combined closure and locking member pivotally mounted adjacent said opening, an actuating tongue on said member, a metal measuring tape having outward spring action engaged within said casing, and an end tip on said tape movable through resilient contact with said tongue outwardly through said casing opening.

6. A cylindrical casing for a measuring tape having a marginal opening, a combined closure and locking member pivotally mounted adjacent said opening, an actuating tongue on said member, a metal measuring tape having outward spring action engaged within said casing, an end tip on said tape movable through resilient contact with said tongue outwardly through said casing opening, and adapted to hold said tongue in closure locking position when within said casing.

7. A casing for a measuring tape having a closure comprising a plate with an angular extension, a pivot at the angle of the plate adjacent an opening in said casing, a metal measuring tape having outward spring action engaged within said casing, said tape bearing resiliently on said plate extension and serving to hold the plate selectively in open, intermediate, and closed position.

FREDERICK O. CARLSON.